United States Patent [19]

Yokoya

[11] Patent Number: 4,963,081
[45] Date of Patent: Oct. 16, 1990

[54] SEPARATOR MANUFACTURING APPARATUS

[75] Inventor: Hisao Yokoya, Nakatsugawa, Japan

[73] Assignee: Mitsubishi Denki Kabushiki Kaisha, Tokyo, Japan

[21] Appl. No.: 430,507

[22] Filed: Nov. 1, 1989

Related U.S. Application Data

[62] Division of Ser. No. 251,365, Sep. 30, 1988, Pat. No. 4,897,026.

[30] Foreign Application Priority Data

| Oct. 1, 1987 | [JP] | Japan | 62-248414 |
| Oct. 1, 1987 | [JP] | Japan | 62-248413 |
| Oct. 26, 1987 | [JP] | Japan | 62-269775 |
| Oct. 26, 1987 | [JP] | Japan | 62-269774 |
| Oct. 26, 1987 | [JP] | Japan | 62-269773 |

[51] Int. Cl.$^5$ .............................................. B29C 33/72
[52] U.S. Cl. ........................................ 425/115; 118/70; 118/203; 156/281; 425/135; 425/223; 425/227; 425/230; 425/232
[58] Field of Search ............ 425/92, 96, 98, 99, 425/101, 115, 140, 143, 145, 147, 150, 223, 447, 227, 135, 230-232; 264/40.1-40.3, 40.7, 171; 156/64, 230, 231, 242, 378, 281; 118/203, 211, 230, 231, 244, 258, 259, 70, 72

[56] References Cited

U.S. PATENT DOCUMENTS

| 2,534,629 | 12/1950 | Schultze | 425/223 X |
| 3,076,999 | 2/1963 | Washburn | 425/223 X |
| 3,524,781 | 8/1970 | Winterroth et al. | 156/231 |
| 3,689,346 | 9/1972 | Rowland | 425/101 X |
| 3,765,809 | 10/1973 | Farrell | 425/92 X |
| 3,811,983 | 5/1974 | Rowland | 156/231 X |
| 3,956,517 | 5/1976 | Curry et al. | 425/223 X |
| 4,246,212 | 1/1981 | Upmeier et al. | 264/40.1 |
| 4,510,103 | 4/1985 | Yamaguchi et al. | 264/40.2 |
| 4,678,419 | 7/1987 | Enkner et al. | 425/143 |
| 4,699,580 | 10/1987 | Co | 425/140 |

FOREIGN PATENT DOCUMENTS

| 3344990 | 6/1985 | Fed. Rep. of Germany | 425/223 |
| 5472437 | 6/1979 | Japan . | |

Primary Examiner—Richard L. Chiesa
Attorney, Agent, or Firm—Oblon, Spivak, McClelland, Maier & Neustadt

[57] ABSTRACT

A separator manufacturing apparatus includes a transfer roller (2) with a plurality of annular shaping grooves (1) having a predetermined shape in cross section which are formed in the outer circumferential surface of the transfer roller in its circumferential direction, a resin feeding device (4) with nozzles (3) feed a hot-melt type resin to the annular shaping grooves (1) of the transfer roller (2), a base paper feeding device (5) to feed a continuous paper (W) at a predetermined speed to the outer circumferential surface of the transfer roller (2) supplied with the resin to thereby form by transfer a plurality of ribs (9) on a surface of the continuous paper (W), and a fault detecting device (6, 36, 46) to detect the shape and/or a dimension of the rib (9) formed by transfer. A resin drop receiving device (53) or an annular shaping groove cleaning device (63) may be provided so that maintenance of the transfer roller (2) can be easy.

8 Claims, 14 Drawing Sheets

SEPARATOR MANUFACTURING APPARATUS

This is a division of Ser. No. 251,765, filed Sept. 30, 1988, now U.S. Pat. No. 4,897,026.

BACKGROUND OF THE INVENTION

1. FIELD OF THE INVENTION

The present invention relates to a separator manufacturing apparatus to manufacture a separating plate having a spacing structure which is used as a structural element for a corrugated board, a battery having a laminated structure, a heat exchanger having a laminated structure and so on. Particularly, the present invention relates to such apparatus to manufacture a separator in which the spacing structure is formed by a resinous material.

2. DISCUSSION OF BACKGROUND

Generally, the structure of a separator, even though some differences are found depending on articles in which a separator is used, is such that ribs or projecting strips made of a resinous material are formed in a comb-like shape on a surface of a flat material such as a film or a sheet to thereby form a space in an article.

The separator has been manufactured by a conventional apparatus or method as disclosed in Japanese Unexamined Patent Publication No. 205966/1982 or Japanese Unexamined Patent Publication No. 72437/1979. Namely, the separator has been manufactured by heat-bonding mono-filaments of resin, which constitute ribs, on a flat plate material by a heat sealer, or by applying in a linear form a highly viscous resin having adhesion properties on a flat plate material, followed by curing it. Since the later method is more advantageous than the former from the standpoint of capability of adopting a continuous process, an apparatus as shown in FIG. 16 is practiced to conduct the later method. Namely, a highly viscous molten resin with adhesion properties is forcibly injected through a plurality of gun nozzles 25 which are arranged in alignment, while a flat plate material 26 is moved in the direction perpendicular to the linearly arranged gun nozzles 25, whereby a plurality of streams of resin are caused to flow on the flat plate material 26, then, the resin is cured. Thus, the same number of ribs 27 as the gun nozzles 25 can be continuously formed at once on the flat plate material 26.

In the method and apparatus as disclosed in Japanese Unexamined Patent Publication No. 205966/10982, it was difficult to continuously form such ribs. According to the conventional technique as shown in FIG. 16, it was possible to continuously form the ribs 27 having a predetermined shape to some extent. However, the technique as in FIG. 16 had such disadvantage that, when an amount of a resin discharged through the gun nozzles 25 was slightly changed, there occurred a change in cross section of the ribs 27, whereby it is difficult to form the ribs 27 having a constant shape and dimensions. The ribs 27 formed on the flat plate material 26 assume a shape of arch in cross section because the shape of the ribs 27 depends on the surface tension of the resin. Accordingly, it is difficult to obtain a desired height in the ribs 27 even though an amount of the resin discharged through the gun nozzles 25 is increased (because the viscocity of the resin cannot be increased without any limitation). Further, vibrations in the apparatus and influence of an air stream may form zig-zag ribs 27, and an accurate pitch between the ribs 27 formed on the flat material cannot be obtained.

OBJECT OF THE INVENTION

It is an object of the present invention to provide a separator manufacturing apparatus capable of continuously producing a separator of high quality at a high speed while ribs of resin having a stable shape and dimensions can be obtained and determination of the shape of the ribs can be flexible.

SUMMARY OF THE INVENTION

In an aspect of the present invention, there is provided a separator manufacturing apparatus which comprises a transfer roller with a plurality of annular shaping grooves having a predetermined shape in cross section which are formed in the outer circumferential surface of the roller in its circumferential direction, a resin feeding device with a nozzle means to feed a hot-melt type resin to the annular shaping grooves of the transfer roller, a base paper feeding device to feed a continuous paper at a predetermined speed to the outer circumferential surface of the transfer roller supplied with the resin to thereby form by transfer a plurality of ribs on a surface of the continuous paper, and a detecting device to detect the shape and/or a dimension of the rib formed by transfer.

In another aspect of the present invention, there is provided a separator manufacturing apparatus which comprises a transfer roller with a plurality of annular shaping grooves having a predetermined shape in cross section which are formed in the outer circumferential surface of the roller in its circumferential direction, a resin feeding device with a nozzle means to feed a hot-melt type resin having highly adhesive properties to the annular shaping grooves of the transfer roller, a base paper feeding device to feed a continuous paper at a predetermined speed to a part of the outer circumferential surface of the transfer roller supplied with the resin to thereby form by transfer a plurality of ribs having a predetermined shape corresponding to the annular shaping grooves on a surface of the continuous paper, and a resin drop receiving device to receive resin drops from the nozzle means of the resin feeding device.

In another aspect of the present invention, there is provided a separator manufacturing apparatus which comprises a transfer roller with a plurality of annular shaping grooves having a predetermined shape in cross section which are formed in the outer circumferential surface of the roller in its circumferential direction, a resin feeding device with a nozzle means to feed a hot-melt type resin having highly adhesive properties to the annular shaping grooves of the transfer roller, a base paper feeding device to feed a continuous paper at a predetermined speed to a part of the outer circumferential surface of the transfer roller supplied with the resin to thereby form by transfer a plurality of ribs having a predetermined shape corresponding to the annular shaping grooves on a surface of the continuous paper, and a shaping groove cleaning device to remove resin remaining in the shaping grooves prior to feeding resin to the shaping grooves.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
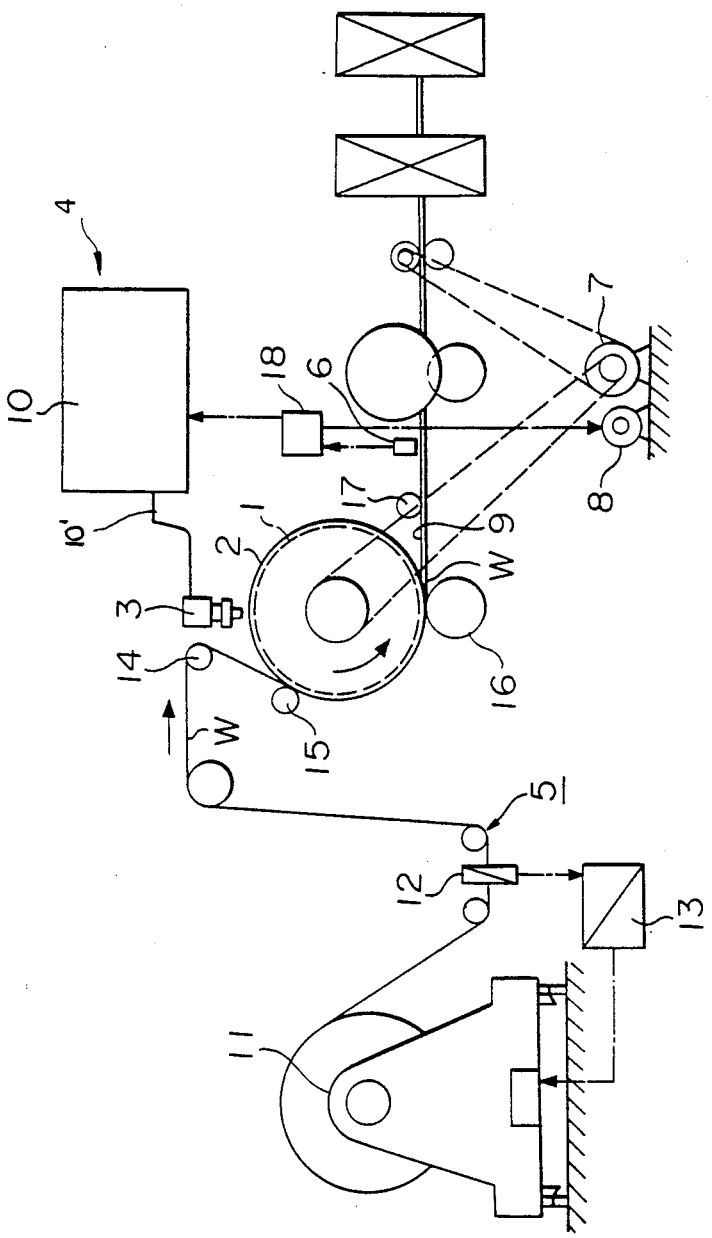
FIG. 1 is a systematic diagram showing a first embodiment of the separator manufacturing apparatus according to the present invention.

Referring to the drawings, wherein the same reference numerals designate the same or corresponding parts throughout several views, and more particularly to FIGS. 1 and 2, there is schematically shown a first embodiment of the separator manufacturing apparatus of the present invention.

The conventional separator manufacturing apparatus adopts a flowing-down system wherein ribs of resin are formed by heat bonding or flowing a resinous material. In the present invention, the ribs of resin are formed on a base paper by transferring. Thus, the present invention adopts a transferring system. With respect to the base paper, it is possible to use a thin flat material having low rigidity other than paper.

In FIG. 1, a separator manufacturing apparatus comprises a transfer roller 2 having an outer circumferential surface in which a plurality of annular shaping grooves 1 having a predetermined shape in cross section are formed in its circumferential direction, a resin feeding device 4 adapted to feed a hot melt type molten resin to the annular shaping grooves 1 of the transfer roller 2 through a plurality of gun nozzles 3, a base paper feeding device 5 to feed a base paper W at a predetermined speed to the outer circumferential surface of the transfer roller 21 and a fault detecting device 6 to detect an undesired protrusion of resin on the base paper after the formation of the ribs.

The transfer roller 2 is horizontally supported and is rotated in one direction at a low speed by means by a motor 8 through a reduction gear 7. The transfer roller 2 is provided with a plurality of the annular shaping grooves 1 in the circumferential surface with a predetermined distance between the adjacent grooves. Each of the annular shaping grooves has a shape and dimensions in cross section which correspond to the shape and dimensions of plurality of ribs of resin 9 to be formed. Namely, it is possible to form a desired shape other than an arch-shape resulted from the conventional flowing-down method. It is possible to select the shape of grooves which are suitable for forming the ribs 9 unless the size of the bottom of the grooves is greater than that of the opening of the grooves. A resin such as ethylene tetrafluoride is coated on the surface of the annular shaping grooves 1, to give good separation properties to the molten resin. A cooling device may be provided in or near the body of the transfer roller 2 to cure the molten resin for a short time.

The resin feeding device 4, comprises a hot melt applicator 10 and a hose 10' connected to the plurality of gun nozzles 3. The hot melt applicator 10 includes a gear pump (not shown) in its resin melting chamber so that molten resin is forcibly supplied to the gun nozzles 3 through the hose 10. The gear pump performs a pumping function to the molten resin in proportion to the rotational speed of the transfer roller 2 by means of a rotation control device (SCR). The gun nozzles 3 connected to the hot melt applicator 10 through the hose 10' are placed on a machine frame which supports the rotary shaft of the transfer roller 2 so that each of the gun nozzles 3 corresponds to each of the annular shaping grooves 1, and the molten resin forcibly supplied through the hose 10' is ejected to the annular shaping grooves 1 at positions close to the grooves. The resin in the hot melt applicator 10 may be a hot melt type resin having adhesion properties such as ethylene-vinyl acetate, APP (a reproduced product of the by-product produced when polypropylene is produced) and so on, and it is heated at a temperature of 120° C.–180° C. in the hot melt applicator 10.

The base paper feeding device 5 is generally constituted by a paper feeding part, a transferring part including the transfer roller 2, and a paper driving part which follows the transfer roller 2. A rewinding reel 11 is moved in the direction perpendicular to the direction of forwarding the base paper W by means of a controller 13 which is actuated by a signal from a displacement detecting device 12 so that the base paper W is forwarded while keeping a correct position. The controller 13 generates a stop signal so as to prevent the base paper W from over-feeding due to a force of inertia.

The displacement detecting device 12 is provided with an air sensitive device, a photo-sensitive device or the like to detect displacement of the base paper W in its width direction, whereby the rewinding reel 11 is actuated by the controller 13.

A guide roller 14 is provided at the final stage of the paper feeding part i.e., at a position above the transfer roller 2 and in front of the gun nozzles 3 with respect to the direction of rotation of the transfer roller (in the counterclockwise direction 2 in FIG. 1). The guide roller 14 is disposed in the projection of the transfer roller 2, and it is movable toward and away from the transfer roller 2 in association with a press roller 15. An additional press roller 16 is provided below the transfer roller 2 so that it is pressed to the outer circumferential surface which constitutes a transferring part. The first press roller is provided at an intermediate position between the gun nozzles 3 and the second press roller 16 on the outer circumferential surface of the transfer roller 2. A stretching force is given to the base paper W by the guide roller 14 and the second press roller 16 in association with the transfer roller 2 so that the base paper W can be in close contact with the outer circumferential surface of the transfer roller 2 in a range of half of the entire length of the outer circumference of the transfer roller 2. The first press roller 15 assures the optimum timing of contact of the base paper W to the transfer roller 2 because the rotation speed of the transfer roller 2 is balanced to the curing speed of the molten resin. The second press roller 16 clamps the base paper W by the aid of the transfer roller 2 to thereby transmit a rotational force of the transfer roller 2 to the base paper W, whereby the base paper W is pulled in the forwarding direction.

The paper driving part comprises a separating roller 17 disposed above and behind the second press roller 16. The separating roller 17 functions to force downwardly the base paper W which tends to wrap on the transfer roller 2 along with the revolution of the roller 2 at the rear part of the downstream side of the outer circumference of the roller transfer 2 to thereby, smoothly separate the base plate on which the ribs 9 are transferred, from the transfer roller 2 and to drive the base paper W smoothly.

When the rate of feeding the resin is too high or the speed of feeding the base paper W is too low, there may take place an undesired protrusion of resin on the base paper W at the area other than the ribs of resin 9. The fault detecting device 6 is to stop the operation of the resin feeding device 4 and the rewinding reel 11 through a controller 18 by detecting the undesired protrusion, until the normal condition of transfer is restored. Basically, when the fault detecting device 6 detects the undesired protrusion of resin, it outputs an output signal at the time of detection to thereby actuate the controller 18.

Figure 2A:
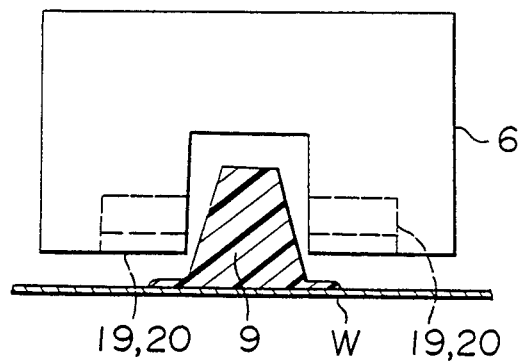
FIG. 2A is a front view partly cross-sectioned which shows a first embodiment of a detecting device to detect the shape of a rib, which is used for the apparatus shown in FIG. 1.
Figure 2B:
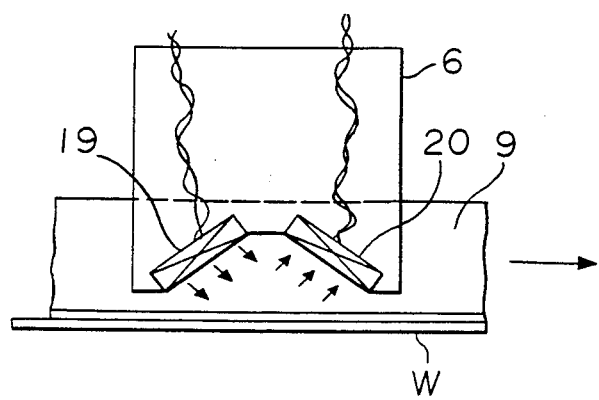
FIG. 2B is a side view of the detecting device shown in FIG. 2A.
Figure 3A:
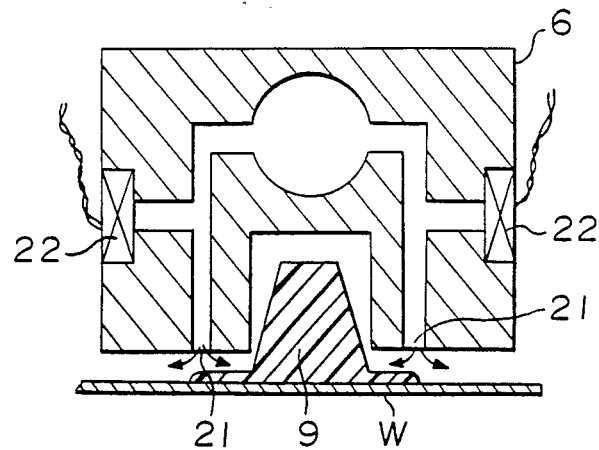
FIG. 3A is a cross-sectional view of a second embodiment of the detecting device.
Figure 3B:
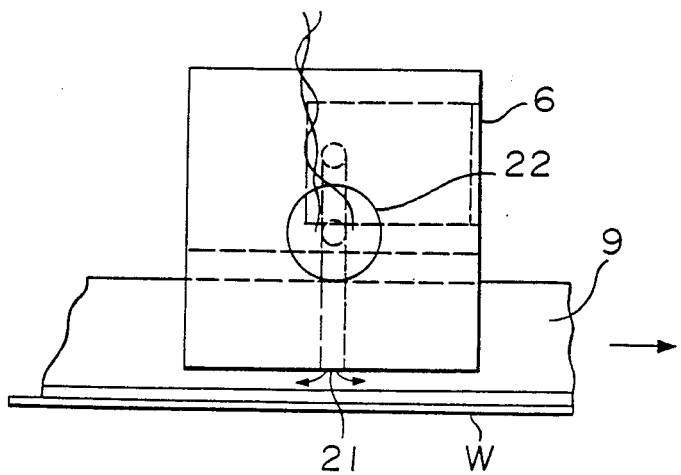
FIG. 3B is a side view of the detecting device shown in FIG. 3A.
Figure 4A:
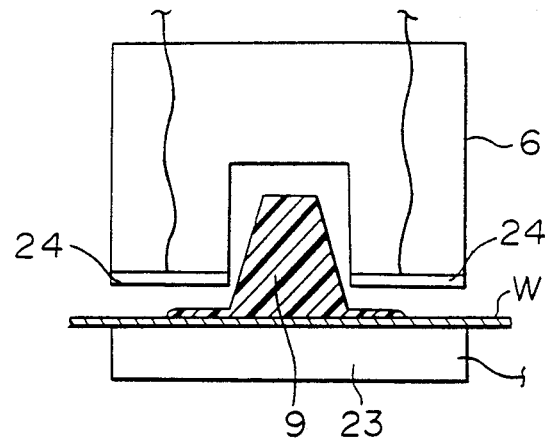
FIG. 4A is a front view partly cross-sectioned of a third embodiment of the detecting device.
Figure 4B:
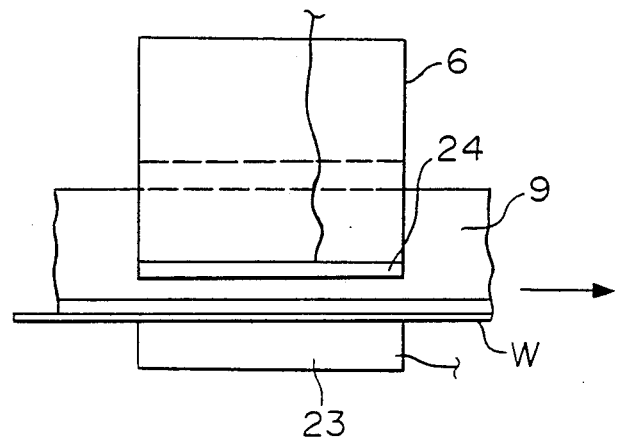
FIG. 4B is a side view of the detecting device shown in FIG. 4A.

The fault detecting device 6 may have an optically detecting structure as shown in FIGS. 2A and 2B, a fluid-dynamically detecting structure as shown in FIGS. 3A and 3B, or an electrically detecting structure as shown in FIGS. 4A and 4B. Namely, the structure as shown in FIGS. 2A, 2B utilizes the fact that the reflecting factor of the resin is greatly different from that of the base paper W. Namely, the intensity of light from a light emitting part 19, which changes due to presence or absence of a protrusion of resin on the base paper, is detected by a light receiving part 20.

In the fluid-dynamically detecting structure as shown in FIGS. 3A and 3B, highly pressurized air is ejected through conduits 21 formed at the lower part of the fault detecting device 6 to the ribs of resin 9, whereby changes in pressure in the vicinity of the air blowing parts are detected by pressure detectors 22. The protrusion of resin changes the resistance of air at the air blowing part, and presence or absence of the protrusion of resin is detected by the change of pressure.

In the structure as shown in FIGS. 4A, 4B, a lower electrode 23 and a detecting electrode 24 are arranged at the both sides of the base paper W on which the ribs of resin 9 are formed, whereby a change in electrostatic capacity between the lower electrode 23 and the detecting electrode 24 is detected to thereby detect the undesired protrusion of resin.

FIGS. 5-7 show preferred embodiments of a rib height detecting device 36 used in place of the fault detecting device 6 in the separator manufacturing apparatus shown in FIG. 1. In FIGS. 5-7, the same reference numerals as in FIG. 4 designate the same or corresponding parts.

The rib height detecting device 36 is adapted to detect the fact that the height, of the ribs 9 is reduced due to shortage of the amount of the resin to be supplied or an insufficient supply of the resin in the annular shaping grooves 1, and to output a signal to the controller 18 so that the operation of the resin feeding device 4 and the rewinding operation of the rewinding reel 11 are stopped.

Figure 5A:
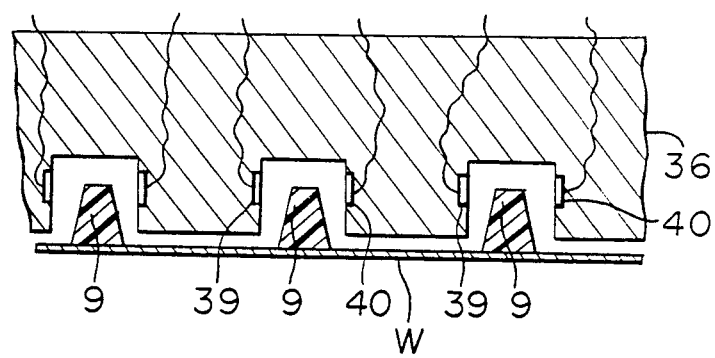
FIGS. 5A and 5B are respectively a cross-sectional view and a side view of a fourth embodiment of the detecting device.
Figure 5B:
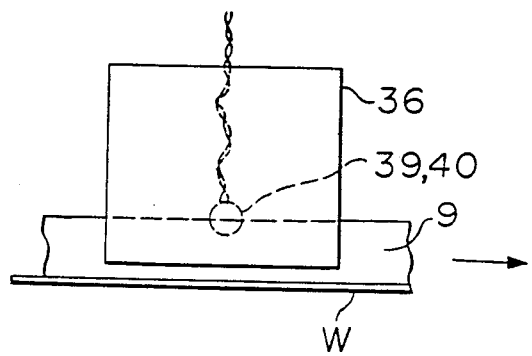
Figure 6A:
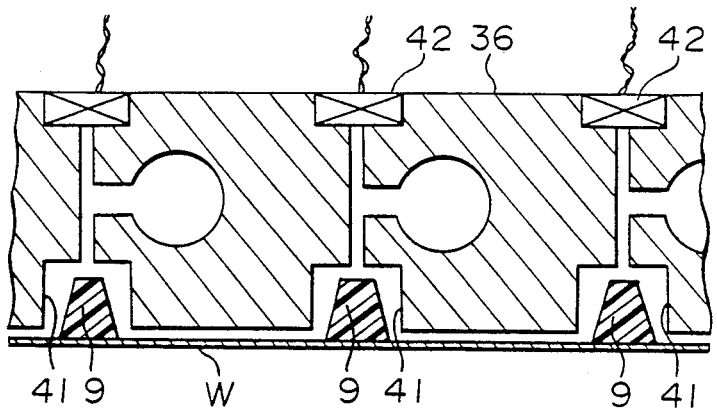
FIGS. 6A and 6B are respectively a cross-sectional view and a side view of a fifth embodiment of the detecting device.
Figure 6B:
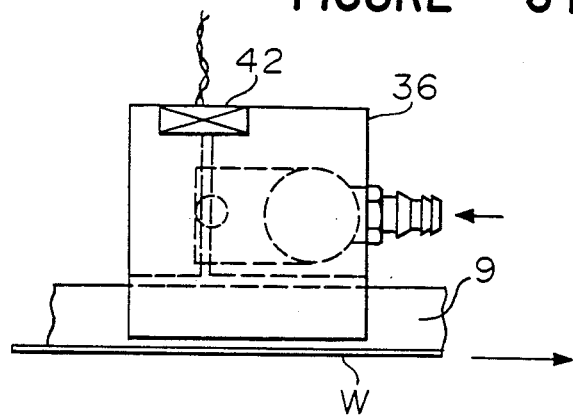
Figure 7A:
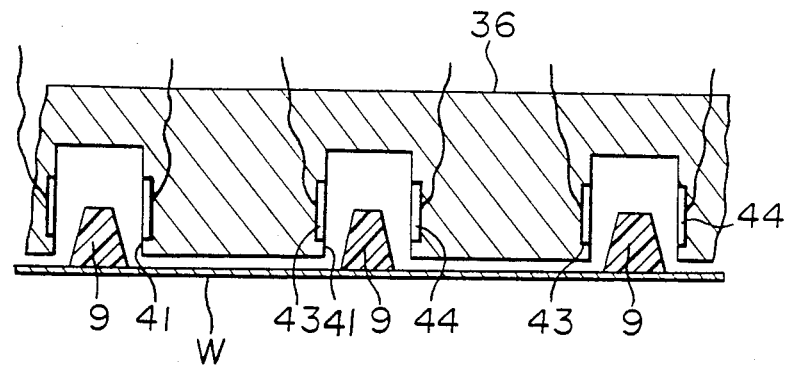
FIGS. 7A and 7B are respectively a cross-sectional view and a side view of a sixth embodiment of the detecting device.
Figure 7B:
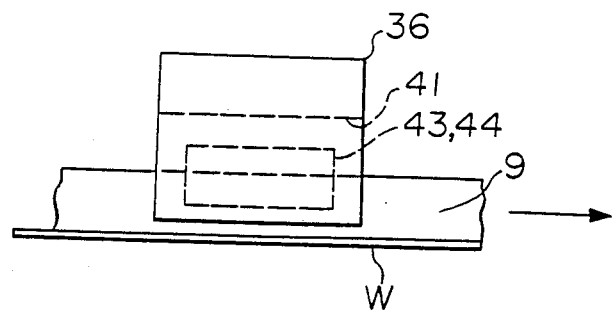

The rib height detecting device 36 may have an optically detecting structure as shown in FIGS. 5A, 5B, a fluid-dynamically detecting structure as shown in FIGS. 6A, 6B, or an electrically detecting structure as shown in FIGS. 7A and 7B.

The rib height detecting device 36 as shown in FIGS. 5A and 5B utilizes the nature of the resin having a small light transmittance. When the height of the rib 9 is insufficient, a strong light from a light emitting part 39 is received by a light receiving part 40, whereby the rib 9 having an insufficient height is detected.

In the structure as shown in FIGS. 6A and 6B, a plurality of guide channels 41 are formed at the lower part of the rib height detecting device 36 so as to correspond to the ribs 9, whereby pressures obtained by blowing highly pressurized air into the guide channels 41 are detected by a corresponding plurality of pressure detecting devices 42. When the height of the rib 9 is insufficient, the flow resistance at the blowing portion is small, whereby the pressure detecting device 42 detects a low pressure. Accordingly, by detecting the pressure change, the rib 9 having an insufficient height can be detected.

In the structure as shown in FIGS. 7A and 7B, guide channels 41 corresponding to the ribs 9 are formed at the lower part of the rib height detecting device 36, and a pair of electrodes 43, 44 are disposed at both side walls of each of the guide channels 41, whereby a change of electrostatic capacity between the electrodes 43, 44 by the rib 9 passed between the electrodes 43, 44 is detected to thereby detect the height of the rib 9. When a rib having an insufficient height is detected by the rib height detecting device 36, the shaping operations of the apparatus is automatically stopped, whereby a faulty spacer having a rib 9 of an insufficient height formed on the base paper W is prevented from being produced.

Another embodiment of the separator manufacturing apparatus as shown in FIG. 1 in which a fault detecting device 46 is used instead of the fault detecting device 6 will be described.

The fault detecting device 46 is constituted in such a manner that, when there occurs an insufficient height in the rib 9 due to shortage of supply of the resin to the shaping groove 1 or the protrusion of the resin to the area other than the shaping area of the rib 9 on the base paper due to an excessive supply of the resin, a reduced feeding speed of the base paper W, or the like, the fault detecting device 46 detects the fault of the rib 9 to output a signal to the controller 18 so that the feeding rate of the resin from the resin feeding device 4 and the feeding speed of the base paper W are controlled to thereby prevent the production of a faulty product, and when fault detecting device 46 detects an insufficient height of the rib 9 or the protrusion of the resin regardless of the controlled operation, the resin feeding device 4 and the rewinding reel 11 are stopped by means of the controller 18 until a normal condition of transfer can be restored. Basically, detection is made by the fault detecting device 46 as to whether or not the height of the ribs 9 is in a predetermined level and whether or not the protrusion of the resin is found. When the height of the ribs 9 does not reach the predetermined level, the amount of resin to be supplied is increased or the speed of feeding the base paper is lowered. When there is found protrusion of the resin, the amount of the resin to be supplied is reduced or the speed is increased.

Figure 8:
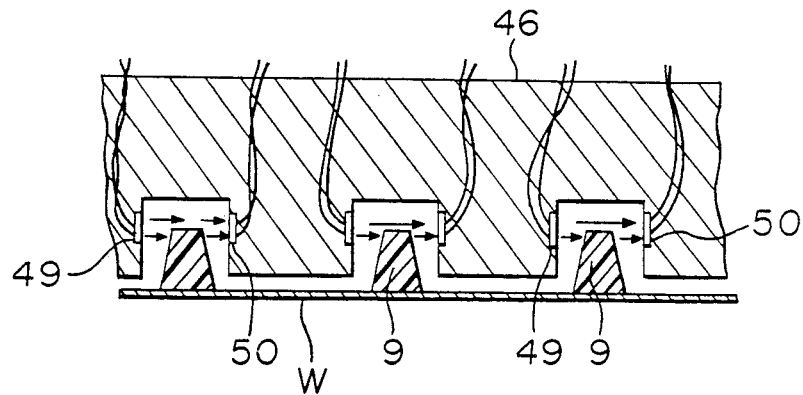
FIGS. 8A and 8B are respectively a cross-sectional view and a side view of a seventh embodiment of the detecting device.
Figure 8:
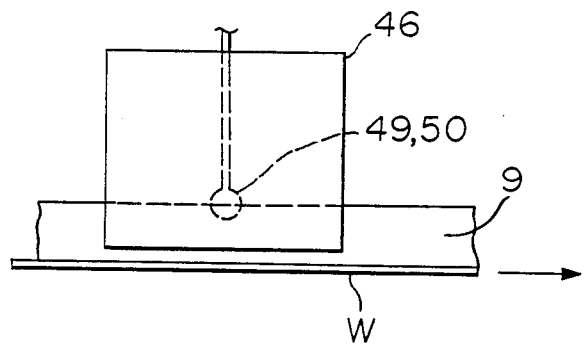

FIGS. 8A and 8B show a construction of the fault detecting device 46 to optically detect the height of the ribs 9. Namely, the fault detecting device 46 as shown in FIGS. 8A and 8B utilizes the fact that the light transmittance of the resin is different from that of air. When the height of the rib 9 is changed, a light receiving part 50 receives light having a different degree of intensity from a light emitting part 49. Means to detect the protrusion of resin, such as the fault detecting device 6 as shown in FIGS. 2A and 2B for the first embodiment, is used in association with the detecting device.

The fault detecting device 46 which detects fluid-dynamically the height of the ribs and the protrusion of resin can be a combination of the structure as shown in FIGS. 3A and 3B and the structure as shown in FIGS. 6A and 6B.

The detecting device which electrically detects the height of the ribs and the protrusion of resin can be a combination of the structure as shown in FIGS. 4A and 4B and the structure as shown in FIGS. 7A and 7B. Thus, determination is made by the fault detecting device 46 as to whether or not the ribs are formed regularly, and the fault detecting device 46 controls a transfer condition through the controller 18, whereby separators can be produced with good quality.

The operation of the separator manufacturing device having the above-mentioned structures will be described.

The base paper W held by the rewinding reel 11 is pulled in accordance with the rotation of the transfer roller 2 and becomes in close contact with the transferring part of the transfer roller 2 so that it wraps the transfer roller 2 in a state without loosing. A constant amount of molten resin fed from the resin feeding device 4 is continuously supplied to each of the annular shaping grooves 1 to fill the grooves with the molten resin. The base paper W is continuously brought into contact with the outer circumferential surface of the transfer roller 2 in which the annular shaping grooves 1 are filled with the molten resin, whereby ribs of resin are continuously formed by transfer on the base paper W. The molten resin filled in annular shaping grooves 1 is gradually cooled by the cooling function of the transfer roller 2, and then cured while the resin is transferred onto the base paper W; thus, the transferred resin is fixedly attached onto the base paper W to form the ribs of resin 9 having a predetermined shape corresponding to annular shaping groove 1. The base paper W with the ribs of resin 9 fixedly attached thereto constitutes substantially a separator, and it is driven while it is separated from the transfer roller 2 at the downstream side of the separating roller 17.

The transfer type separator manufacturing apparatus of the present invention has various features as follows. The shape in cross section of the rib 9 can be determined with flexibility. The height of the rib 9 can be determined by the annular shaping groove 1 regardless of the viscocity of resin to be used. There is no outer disturbance such as influence of an air stream, or vibrations in the apparatus since molten resin is held in the annular shaping grooves 1 so that a separator having high accuracy and high quality can be continuously obtained with a small amount of resin.

In the detecting operations by the detecting device 6, 36 or 46 as to whether or not the transfer of the ribs 9 is regularly carried out, when the detecting device detects a rib 9 having an insufficient height and/or the protrusion of resin from the rib, adjustment of speed for forming the ribs and adjustment of resin supply are automatically carried out, whereby production of a faulty separator can be minimized.

Another embodiment of the separator manufacturing apparatus according to the present invention will be described with reference to FIGS. 9–12, wherein the same reference numerals as in FIGS. 1–8 designate the same or corresponding parts, and therefore description of these parts is omitted.

Figure 9:
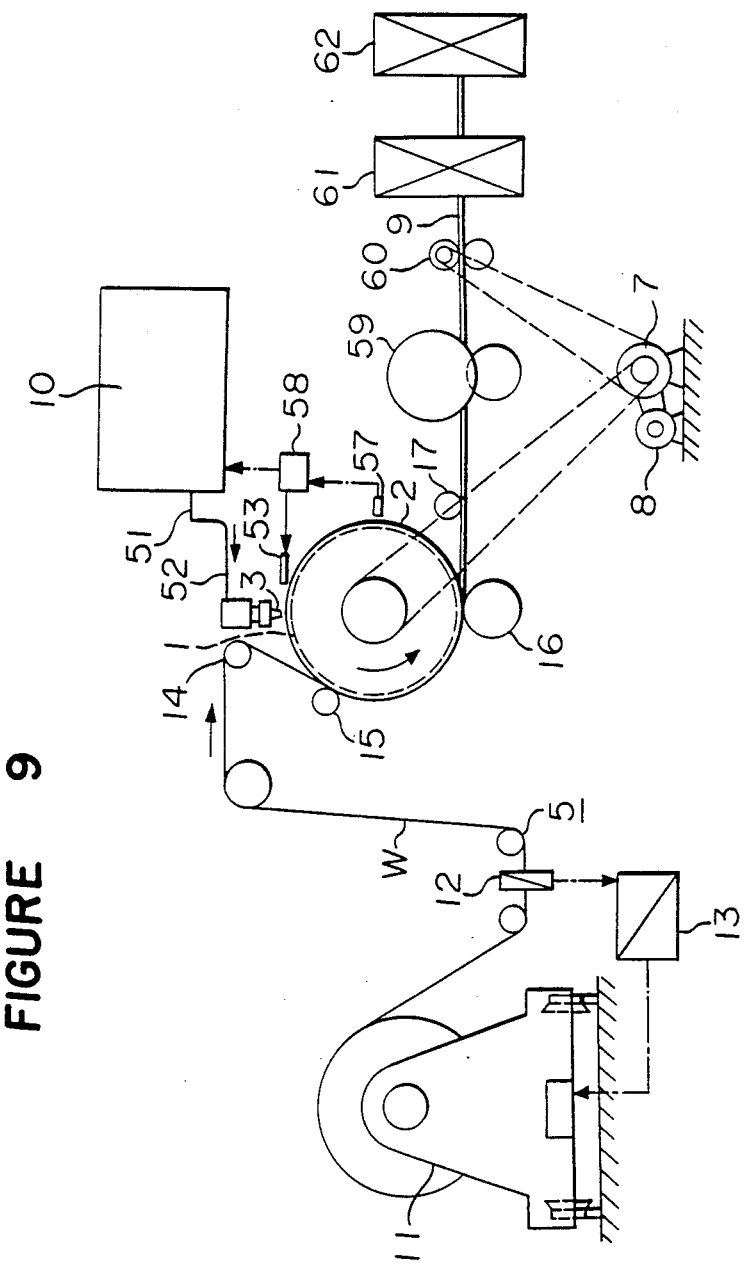
FIG. 9 is a systematic diagram showing a second embodiment of the separator manufacturing apparatus of the present invention.
Figure 10:
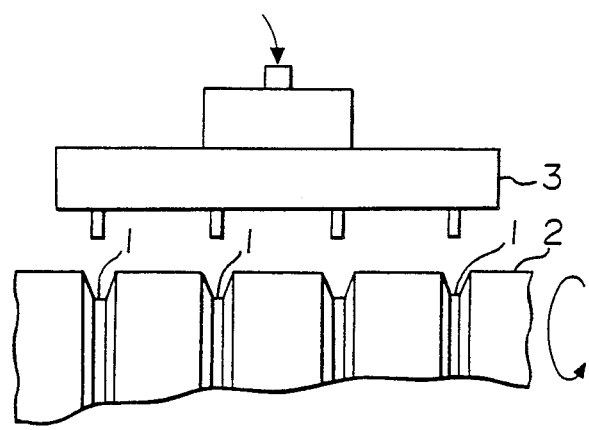
FIG. 10 is a diagram showing the relation between a transfer roller and gun nozzles.

In FIG. 9, a resin feeding device 51 comprises a hot-melt applicator 10, a hose 52, a plurality of gun nozzles 3, and a resin drop receiving device 53.

Figure 11:
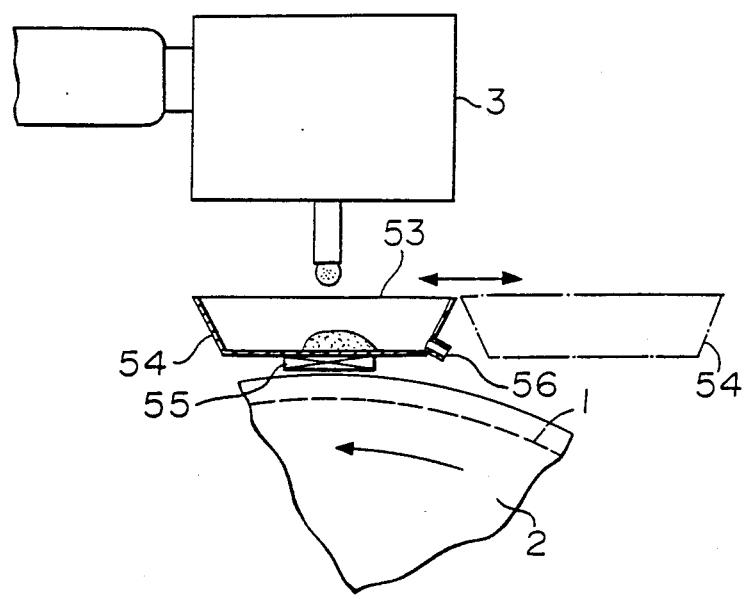
FIG. 11 is a diagram of a first embodiment of a resin drop receiving device used for the apparatus shown in FIG. 9.
Figure 12:
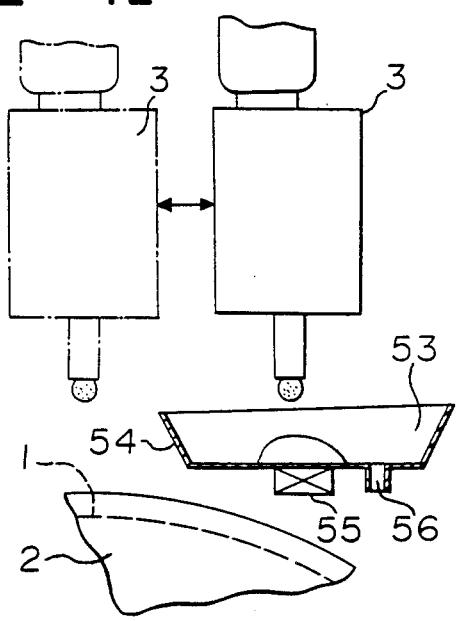
FIG. 12 is a diagram showing a second embodiment of the resin drop receiving device.

The resin drop receiving device 53 is disposed near the gun nozzles 3 and is so constructed that it is laterally movable and is positioned just below the gun nozzles 3 as shown in FIG. 11. Alternatively, a construction in which the resin drop receiving device 53 is fixed near the gun nozzles 3 and the gun nozzles are movable laterally or vertically to the position (as shown in FIG. 12) may be possible. The resin drop receiving device 53 comprises a dish-like container 54 to receive resin drops falling from the gun nozzles 3, a heater 55 to melt the resin in the dish-like container 54, and a discharge port 56 to discharge molten resin outside the dish-like container 54.

Resin drops often fall when the gun nozzles 3 and the hot-melt applicator 10 are heated before starting the operations, the gun nozzles 3 are replaced, the apparatus is stopped due to a trouble during the operations, or the operation of the apparatus is finished. Since the resin has strong adhesion properties, it takes much time to start the operations if the resin drops are left on the transfer roller 2. Further, in order to maintain continuously the operation of the resin drop receiving device 53 and, in order to remove easily the resin drops from resin drop receiving device 53, a thin film of lubricant is formed on the receiving surface of the dish like container 54 of the resin drop receiving device 53. A thin film of fluorine plastics, polyamide, polyacetal, polypropylene, or silicon plastics may be coated on the receiving surface or at least a portion thereof for receiving the resin drops. The heater 55 is provided so that the resin having adhesion properties is easily made molten and discharged through the discharge port 56 at an appropriate time. The thin film of lubricant may be formed by a mixture of a material selected from the group consisting of molybdenum disulfide, PbO, $CaF_2$ and micronized ceramics, and a binder such as silicon plactics, or by molybdenum disulfide by using a spattering method or a chemical reaction method, or by ion-plating a soft metal such as gold, silver, lead and so on. It is also effective that a portion to receive 25 the resin drops in the dish-like 54 is formed by a material such as polyurethane rubber, EPT rubber and so on which has elasticity and non-adhesion properties.

In FIG. 9 the reference numeral 57 designates a failure detecting device which detects resin remaining in the annular shaping grooves 1 of the transfer roller 2 so that it generates a signal to a controller 58 to stop the operations of the resin feeding device 51 and the rewinding reel 11, and to operate the resin drop receiving device 53.

The reference numeral 59 designates a slitter which aligns the width of the base paper W on which the ribs 9 are formed and cuts the paper W to give a predetermined width. The numeral 60 designates an auxiliary driving roller which separates the base paper W from the transfer roller 2 smoothly, cooperates with the slitter 59 to cut the base paper smoothly, and drives the paper W to the next step, the circumferential speed of the auxiliary driving roller 60 being the same as that of the transfer roller 2. The numeral 61 designates a cutting device, and the numeral 62 designates a piling device.

In the operation of the embodiment shown in FIGS. 9 to 12, the resin drop receiving device 53 receives resin drops without causing the adhesion of the resin drops on the transfer roller 2, whereby maintenance of the transfer roller 2 can be easy.

Another embodiment of the separator manufacturing apparatus according to the present invention will be described with reference to FIGS. 13 to 15. The same reference numerals as in FIGS. 1 to 12 designate the same or corresponding parts, and therefore, description of these parts is omitted.

Figure 13:
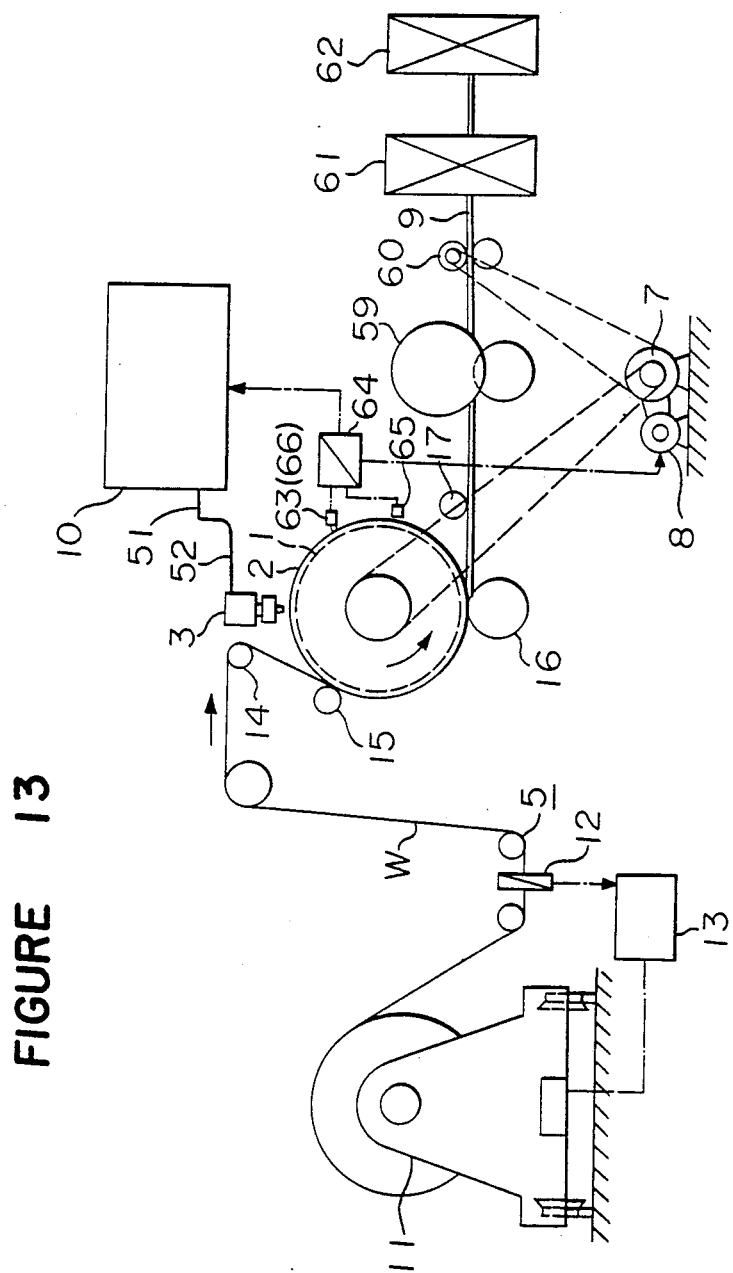
FIG. 13 is a systematic diagram showing a third embodiment of the separator manufacturing apparatus of the present invention.
Figure 14:
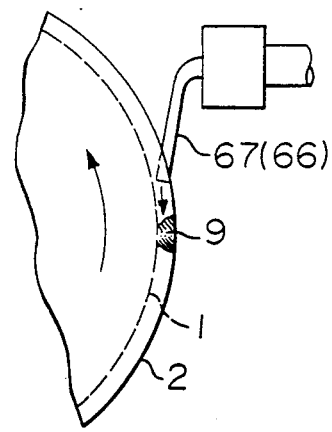
FIG. 14 is a diagram of a first embodiment of a groove cleaning device used for the apparatus shown in FIG. 13.
Figure 15:
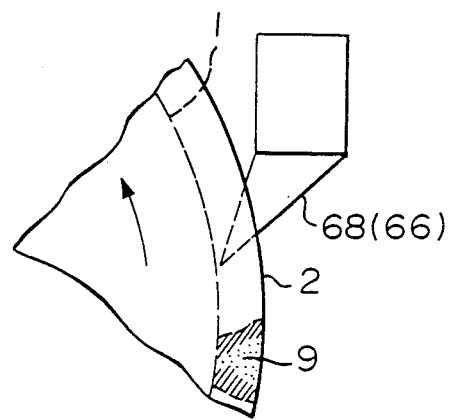
FIG. 15 is a diagram of a second embodiment of the groove cleaning device.
Figure 16:
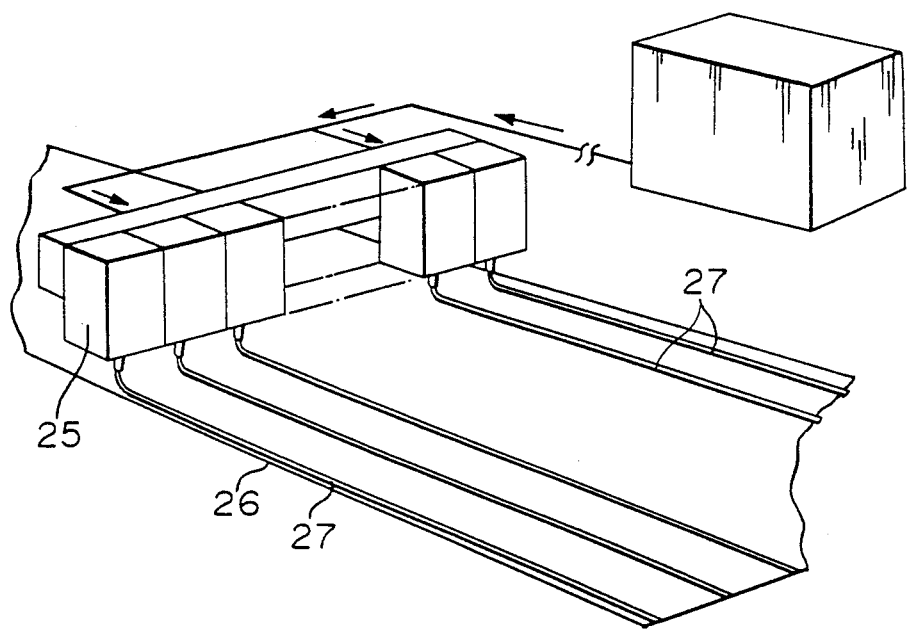
FIG. 16 is a perspective view partly omitted of a conventional separator manufacturing apparatus.

In FIGS. 13 to 15, the separator manufacturing apparatus of the present invention is provided with an annular shaping groove cleaning device 63 which is adapted to remove resin remaining in the annular shaping grooves 1 before a new supply of resin is supplied to the annular shaping grooves 1 of the transfer roller 2.

The annular shaping groove cleaning device 63 is disposed at a side where the base paper W is not in contact with the transfer roller 2 to remove the resin P remaining in the annular shaping grooves 1 due to insufficient separation of the resin before a new supply of resin is supplied to the annular shaping grooves, whereby the annular shaping grooves 1 are ready to receive the annular molten resin.

The shaping groove cleaning device 63 comprises a detector 65 to detect the presence or absence of the resin in the annular shaping grooves 1 and to output a detecting signal to a controller 64 and a removing member 66 to be actuated by the controller 64 to thereby remove, the resin P remaining in the annular grooves 1.

FIG. 14 shows an embodiment of the removing member 66 which has nozzles 67 opening to each of the annular shaping grooves 1 but in the direction opposite the direction of rotation of the transfer roller 2 so that the resin P remaining in the annular shaping grooves 1 is blown off by pressurized air ejected through the nozzles 67.

FIG. 15 shows another embodiment of the removing member 66 which has scraping pawls 68 extending in each of the annular shaping grooves 1 in a non-contact state to thereby remove the resin remaining in the annular grooves 1.

The embodiment of FIG. 14 has an advantage that a non-contact state of the free end of the nozzles 67 is easily obtained and a controlled operation for peeling-off the base paper W can be easy. The later embodiment FIG. 15 has an advantage that the entire construction is simple.

Each of the scraping pawls 68 has a thin film of lubricant on its surface in consideration of a possible contact with the annular shaping grooves 1. The scraping pawls 68 may be formed by fluorine plastics, polyethylene, polypropylene, polyamide, polyacetal, and so on in its entirety. The thin film may be formed by a lubricant including a coating material of fluorine plastics, or a coating material of modified fluorine including powder of fluorine plastics, or coating material of silicon plastics, or a mixture of a binder of silicon plastics and molybdenum disulfide, PbO, $CaF_2$, or micronized ceramics. Further, the thin film may be formed of molybdenum disulfide by using a spattering method or a chemical reaction method, or by ion-plating a soft metal such as gold, silver, lead and so on.

In the operation of the separator manufacturing apparatus shown in FIGS. 13-15, the annular shaping groove cleaning device 63 can remove the resin remaining in the annular shaping grooves 1 which occurs due to insufficient separation of the resin from the annular shaping grooves 1 during operation of the apparatus, whereby occurrence of a faulty product can be minimized to thereby increase efficiency and to form the ribs 9 at a high speed.

In the construction of the separator manufacturing apparatus of the present invention, the resin drop receiving device 53 as shown in FIGS. 9 to 12 or the annular shaping groove cleaning device 63 as shown in FIGS. 13 to 15 or the both devices may be provided in the embodiment, as shown in FIG. 1. At least the detecting means 6, 36, 46 as shown in FIGS. 2 to 8 and the annular shaping groove cleaning device 63 in FIGS. 13 to 15 may be provided in the embodiment as shown in FIGS. 9 to 12. At least the above-mentioned detecting means 6, 36, 46 and the above-mentioned resin drop receiving device 53 may be provided in the embodiment as shown in FIG. 13.

Obviously, numerous modification and variation of the present invention are possible in light of the above teachings. It is therefore to be understood that, within the scope of the appended claims, the invention may be practiced otherwise than as specifically described herein.

What is claimed is:

1. A separator manufacturing apparatus which comprises:
    a transfer roller with a plurality of annular shaping grooves having a predetermined shape in cross section which are formed in the outer circumferential surface of said roller in its circumferential direction,
    a resin feeding device with a nozzle means to feed a hot-melt type resin having high adhesion properties to said annular shaping grooves of the transfer roller, a base paper feeding device to feed a continuous paper at a predetermined speed to a part of said outer circumferential surface of the transfer roller supplied with said resin to thereby form by transfer a plurality of ribs having a predetermined shape corresponding to the annular shaping grooves on a surface of said continuous paper, and a shaping groove cleaning device positioned to remove resin remaining in said shaping grooves after forming said ribs on said paper and prior to feeding resin additional resin to said shaping grooves.

2. The separator manufacturing apparatus according to claim 1, wherein said shaping groove cleaning device comprises scraping pawls formed by polyethylene, polypropylene, polyamide, or polyacetal.

3. The separator manufacturing apparatus according to claim 1, wherein said shaping groove cleaning device comprises a detecting device to detect resin remaining in said shaping grooves and a removing member to remove the resin by a detecting signal of the detecting device.

4. The separator manufacturing apparatus according to claim 3, wherein said removing member comprises shaping pawls formed by flourine plastics.

5. The separator manufacturing apparatus according to claim 3, wherein said removing member comprises scraping pawls having a thin film formed by a coating material of flourine plastics, a coating material of modified flourine containing powder of flourine plastics, or a coating material of silicon plastics.

6. The separator manufacturing apparatus according to claim 3 wherein said removing member comprises scraping pawls having a thin film of lubricant formed by a binder of silicon plastics and a material selected from a group consisting of molybdenum disulfide, PbO, $CaF_2$ and micronized ceramics.

7. The separator manufacturing apparatus according to claim 3, wherein said removing member comprises scraping pawls having a thin film formed on the scraping pawls by spattering or chemically reacting molybdenum disulfide.

8. The separator manufacturing apparatus according to claim 3, wherein said removing member comprises scraping pawls having a thin film formed on the surface of the scraping pawls by ion plating gold, silver or lead.

* * * * *